(12) United States Patent
Panciroli

(10) Patent No.: US 8,735,468 B2
(45) Date of Patent: May 27, 2014

(54) EXTRUSION METHOD AND A PLANT THEREFOR

(75) Inventor: Carlo Panciroli, Gavasseto (IT)

(73) Assignee: Ariostea M.H.S. S.r.L., Brescia (IT)

( * ) Notice: Subject to any disclaimer, the term of this patent is extended or adjusted under 35 U.S.C. 154(b) by 604 days.

(21) Appl. No.: 12/990,915

(22) PCT Filed: May 7, 2008

(86) PCT No.: PCT/IT2008/000309

§ 371 (c)(1),
(2), (4) Date: Jan. 25, 2011

(87) PCT Pub. No.: WO2009/136419

PCT Pub. Date: Nov. 12, 2009

(65) Prior Publication Data

US 2011/0112220 A1     May 12, 2011

(51) Int. Cl.
*C08J 3/20*     (2006.01)
(52) U.S. Cl.
USPC ............................................. 523/351
(58) Field of Classification Search
USPC ........................................ 523/351; 260/23
See application file for complete search history.

(56) References Cited

U.S. PATENT DOCUMENTS

| | | | |
|---|---|---|---|
| 3,141,575 A | | 7/1964 | Brewer |
| 3,932,323 A | * | 1/1976 | Perry ............................ 523/351 |
| 4,040,997 A | * | 8/1977 | Van Vonno et al. ........... 524/178 |
| 4,510,271 A | | 4/1985 | Muhle et al. |
| 5,405,917 A | * | 4/1995 | Mueller et al. ............. 525/333.8 |
| 5,516,814 A | * | 5/1996 | Trotoir ......................... 523/122 |
| 6,127,444 A | * | 10/2000 | Kadri ............................ 521/139 |
| 2003/0036598 A1 | * | 2/2003 | Yamasa et al. ................ 524/495 |

FOREIGN PATENT DOCUMENTS

| | | |
|---|---|---|
| DE | 102006024724 A1 | 1/2007 |
| GB | 2102688 A | 2/1983 |

* cited by examiner

*Primary Examiner* — Hannah Pak
(74) *Attorney, Agent, or Firm* — Volpe & Koenig P.C.

(57) ABSTRACT

A method for extrusion of polymer products is provided. The method includes preparing a base mixture in a turbomixer the base mixture containing polymer powders and at least an additive. The method also includes introducing the base mixture into at least an extruder, via a mixer into which an additional quantity of the additive and/or at least a further additive is introduced.

3 Claims, 2 Drawing Sheets

EXTRUSION METHOD AND A PLANT THEREFOR

TECHNICAL FIELD

The invention relates to a method and a plant for extrusion of polymer products, among which, for example, tubes and shaped bars.

In more detail, the invention relates to preparation of a mixture of polymers and additives which is used in extruders for realising the above products.

BACKGROUND ART

As is known, extruders are supplied with a mixture of solid loose particles, the mixture generally being made up of polymer powders, for example PVC, and one or more additives, including for example fillers, stabilisers, plasticisers, slips, colorants and others.

Starting from this mixture of loose particles, the mechanical and thermal actions of the extruder enables a continuous, solid and compact manufacture to be produced, such as a tube or a shaped bar.

Each additive present in the initial mixture has a specific function.

Thus, for example, colorants serve to obtain a product of a desired colour, plasticisers for a plastic consistency (rubbery), slips are for improving the workability and facilitating the flowing of the mixture into the inside of the extruder, while stabilisers prevent chemical alteration of the other components of the mixture.

The filler is usually a low-cost inert aggregate which, though having technological functions if added in small percentages (about 2%), is in general added to the mixture in order to reduce the quantity of polymer material to be used.

One of the most commonly-used fillers is calcium carbonate in powder form. Naturally the presence of a filler in the initial mixture reduces the mechanical characteristics of the product obtainable through the following extrusion. Therefore, the percentage of filler is selected on the basis of the quality of the product to be obtained, from a minimum value for high-quality products, for example for realising pressurised tubes, to a maximum value for products requiring lower performance, such as for example pipes for drains and sewers.

The initial mixture is prepared in a turbomixer, which generally comprises an external casing into which the polymer powders and the additives are loaded, and a rotating reel which rotates at high velocity internally of the external casing.

Thanks to the rapid rotation of the reel, the solid loose particles making up the mixture are subjected to both a purely mechanical mixing effect and to an increase in temperature.

The combination of these mechanical and thermal effects are such that inside the turbomixer the particles of the filler and the other additives become uniformly distributed and definitively bonded to the polymer powders, forming with them aggregate particles.

The aggregate particles are very effective in obtaining good results in the following extrusion stage; in the sector many are convinced that the final formulation of the mixture can be obtained only internally of the turbomixer, i.e. that the turbomixer has to be filled with the exact percentages of polymer powders and additives required for the specific product to be extruded.

The fact that many are convinced of the foregoing, however, leads to creating various drawbacks and technical limitations.

A first drawback is that for each different formulation of the mixture, i.e. for each type of product to be extruded, it is necessary to have a respective line of accumulation and distribution downstream of the turbomixer, which not only makes extrusion plants very expensive but also makes them very rigid from the functional point of view, and therefore difficult to manage.

Further drawbacks originate from the phenomenon known as segregation of the additives in the mixture.

It has been found that during the preparation with the turbomixer of PVC powder mixtures and calcium carbonate, when the percentage of calcium carbonate exceeds a threshold value of about 12% of the overall mass, effective aggregation of the two components is no longer achieved, and the excess calcium carbonate remains physically separated from the PVC powders.

It has also been discovered that when the percentage of calcium carbonate is close to the above-mentioned limit value, the two components easily separate later on, for example during storage and/or transport towards the extruder.

The calcium carbonate particles which remain free in the mixture have density and dimensional characteristics which are different with respect to PVC powders, and for this reason they tend to accumulate in some circumscribed zones (sacks) in the overall volume of the mixture, in which the concentration thereof is therefore greater than the required percentage.

This segregation phenomenon is especially manifested during transport of the mixture from the turbomixer towards the extruder, but can also be manifested when the mixture is still inside, for example, storage silos.

The presence of the localised accumulations of calcium carbonate is very risky for the success of the extrusion process, as they can cause considerable defects in the finished products, for example they can cause production of extruded tubes which exhibit holes and/or ruptures.

As it is not possible to act on the composition of the mixture, which has to be rigorously prepared internally of the turbomixer, the only solution at present practicable to prevent these defects is that of over-sizing the products, for example by increasing the thickness of the walls of the tubes to be extruded, with a consequent greater consumption of material and an increase in production costs.

The phenomenon of segregation which has been illustrated herein in relation to a mixture of PVC and calcium carbonate also occurs with mixtures formed by other types of polymer powders and/or other filler substances.

Further, the phenomenon of segregation is also manifested for many other additives which are added to the mixture, which when they go above a relative critical percentage remain free in the mixture and thus tend to gather in circumscribed zones.

The bad dispersion of these additives, among which for example stabilisers, slips and colorants, causes not only a low finished product quality, but also a poor performance of the additives themselves.

Thus, the additives have often to be added to the mixture in greater percentages than those which are in theory necessary, generating a further increase in production costs.

DISCLOSURE OF INVENTION

An aim of the present invention is to increase flexibility of the extrusion process, with the possibility of eliminating or at least reducing to a minimum the phenomenon of segregation of the additives, when the formulation of the mixture includes a percentage of the additives which is greater than the critical value.

A further aim of the invention is to reach the above-mentioned objective with a solution which is simple, rational and relatively inexpensive.

These aims are attained by the characteristics of the invention reported in the independent claims. The dependent claims delineate preferred and/or particularly advantageous aspect of the invention.

In particular, a method is provided for extrusion of polymer products, which includes preparing a base mixture in a turbomixer, which mixture comprises polymer powders and at least an additive, and introducing the base mixture into at least an extruder, via a mixer into which an additional quantity of the additive and/or the at least a further additive is introduced.

Thanks to this solution, the base mixture can have a standard formula, compatible with the quality of all the products to be extruded, i.e. with percentages of additives which are less than or equal to those required for higher-quality products.

The base mixture is thus enriched with additives in the mixer, immediately upstream of the extruder, with the quantities required for reaching the designated composition for the relative product to be extruded, obtaining an effective final mixture notwithstanding the fact that part of the additives have been added outside of the turbomixer.

It has been found that although these additives cannot aggregate with the polymer powders, as happens in the turbomixer, they are equally distributed throughout the mass of the polymer powders in an adequately uniform way, so that on exiting the mixer the final mixture is directly introduced into the extruder.

With the method of the invention high flexibility in the extrusion process can be attained, for example by introducing the base mixture, which can be prepared in a single turbomixer and distributed using a single line internally of a plurality of distinct extruders via respective mixers, in each of which a respective additional quantity of the additive and/or the other additives is introduced, such as to obtain for each extruder the requested formulation for the relative product to be extruded.

In an especially advantageous alternative of the invention, the method includes preparing a base mixture containing at least an additive in a lower percentage with respect to the relative critical value for the phenomenon of segregation, thus obtaining a very stable base mixture which can be transported and stored without problems.

The base mixture will then be enriched internally of the mixer with further quantities of the additive, such as to obtain a final mixture in which the concentration of the additive is superior to the critical percentage, without being subject to the phenomenon of segregation.

The mixer uniformly distributes the additional particles of additive which, though remaining physically separated from the polymer powders, do not have either the time or the space to segregate, as on exiting the mixer the final mixture is directly introduced into the extruder.

In this way it is further possible to obtain products extruded with high percentages of additives, for example with high percentages of filler, without running the risk of the appearance of defects and thus without having to increase the dimensions of the final product, reducing the production costs. The invention makes available a plant for carrying out the method as described above.

The plant comprises a turbomixer for preparing a base mixture of polymer powders and at least an additive, and at least an extruder which is supplied with the base mixture via a mixer, to which mixer are associated batching means which introduce into the mixer further quantities of the additive and/or of at least one other additive.

The plant of the invention preferably comprises a plurality of extruders, each of which can be supplied with the base mixture by means of a respective mixer, to which mixer batching means are associated for introducing further quantities of the additive and/or of the at least an additive into the mixer.

In a preferred aspect of the plant of the invention, each mixer is associated to detecting means, for example loading cells, which detect the quantity of material contained therein.

The batching means too can be associated to relative detecting means (for example loading cells) which quantify the material contained therein, for example for detecting, moment by moment, the amount dispensed and enabling a more precise control of the plant.

Further characteristics and advantages of the invention will emerge from the detailed description that follows, provided by way of non-limiting example, with the aid of the appended figures of the drawings.

BEST MODE FOR CARRYING OUT THE INVENTION

Figure 1:
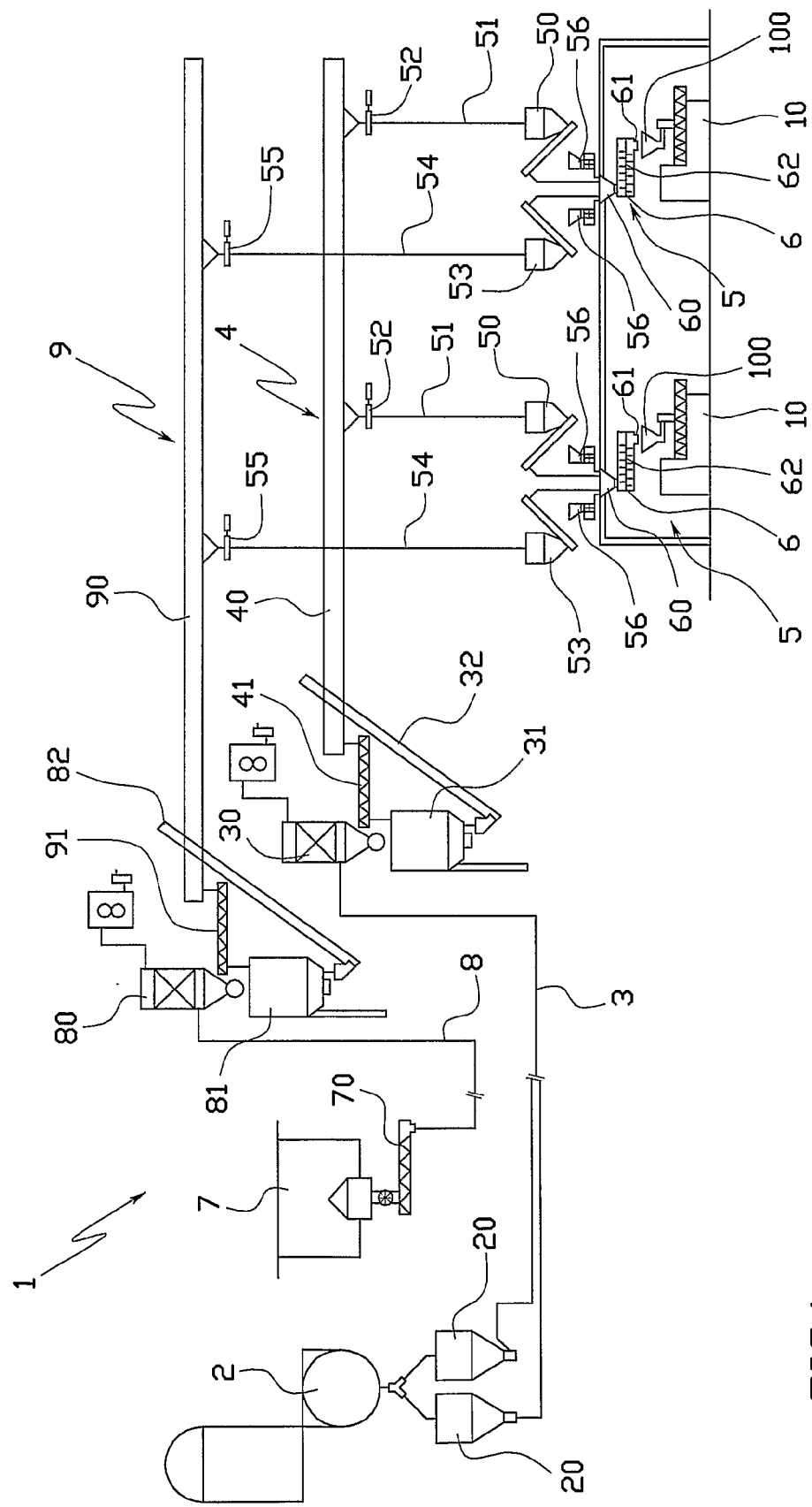
FIG. 1 is a diagram of a plant of the invention.

The figures of the drawings illustrate a plant 1 for extrusion of polymer products, such as for example tubes and/or shaped bars, starting from a mixture of solid loose particles, formed by polymer powders and additives, among which, for example, fillers, stabilisers, plasticisers, slips, colorants and others.

The plant 1 is described herein with reference to an extrusion process of PVC-based products with calcium carbonate as a filler. This does not mean however that the plant 1 cannot be used similarly with other types of polymer powders and/or other types of filler.

The plant 1 is provided with a usual turbomixer 2, which generally comprises an external casing, into which the polymer powders and the additives are introduced in granular or powder form, and a rotating reel which rotates at high speed internally of the casing. The rapid rotation of the reel generates both mechanical and thermal effects, which enable a stable aggregation to be obtained among the polymer particles and the additive particles.

In more detail, the following powders are loaded into the turbomixer 2: PVC powders, calcium carbonate and possibly one or more further additives such as to form a base mixture having a predetermined formulation.

The percentage of calcium carbonate in the base mixture can vary according to production needs: for example it can be 2-3% of the overall mass of the mixture, in a case in which high-quality products are to be extruded, such as pressurised tubes, or it can be higher if the products to be extruded are of lower quality.

In each case it is preferable that the percentage of calcium carbonate in the base mixture is lower than about 12% of the overall mass, i.e. at the critical value beyond which it can manifest the segregation phenomenon, and more preferably not greater than about 10%.

In this way, a very stable base mixture is obtained inside the turbomixer 2, in which the calcium carbonate particles are perfectly aggregated to the PVC powders, the base mixture being thus easy and economical to transport and store without manifesting the effects of segregation.

In the illustrated embodiment, the outlet mouth of the turbomixer 2 is connected to a pair of storage containers 20 which in turn are connected to a single pneumatic transporter 3.

The pneumatic transporter 3 transports the base mixture contained in the storage containers 20 towards a cyclone filter 30, internally of which the base mixture is separated from the air which transports it, and is discharged into a collection tank 31.

The base mixture passes through the discharge mouth of the collection tank 31 into a screw conveyor 32, which releases the mixture onto a first distribution line 4.

The first distribution line 4 comprises a usual chain transporter 40 which has the characteristic of guaranteeing a rather delicate movement of the base mixture, and which supplies the base mixture to two distinct extrusion chambers 5.

The first distribution line 4 further comprises a screw conveyor 41, which is located at the end of the return branch of the chain conveyor 40 such as to collect the base mixture which has not been dispensed at the extrusion stations 5 and to newly tip it into the collection tank 31.

The plant 1 is further provided with a storage silo 7, which contains the same filler material already used in the base mixture, in the example calcium carbonate in powder form.

The storage silo 7 is associated to a screw conveyor 70 which transfers the calcium carbonate to a pneumatic conveyor 8.

The pneumatic conveyor 8 transports the calcium carbonate towards a filter cyclone 80 internally of which the carbonate powders are separated from the air that transports them, such that they are discharged internally of a collection tank 81.

The discharge mouth of the collection tank 81 opens into a screw conveyor 82, which receives the calcium carbonate and releases it onto a second distribution line 9.

The second distribution line 9 is similar to the one used for the base mixture, and thus comprises a chain transporter 90 which supplies the calcium carbonate to both the extrusion stations 5, and a screw conveyor 91, which receives the calcium carbonate which may not have been dispensed, such as newly to tip it into the collection tank 81.

Each extrusion station 5 comprises a first batching group 50, which is connected to the first distribution line 4 by means of a conduit 51 which comprises a loading mouth, in which the chain transporter 40 releases the base mixture, and a check valve 52 for regulating the flow of the base mixture towards the first batching group 50.

Figure 2:
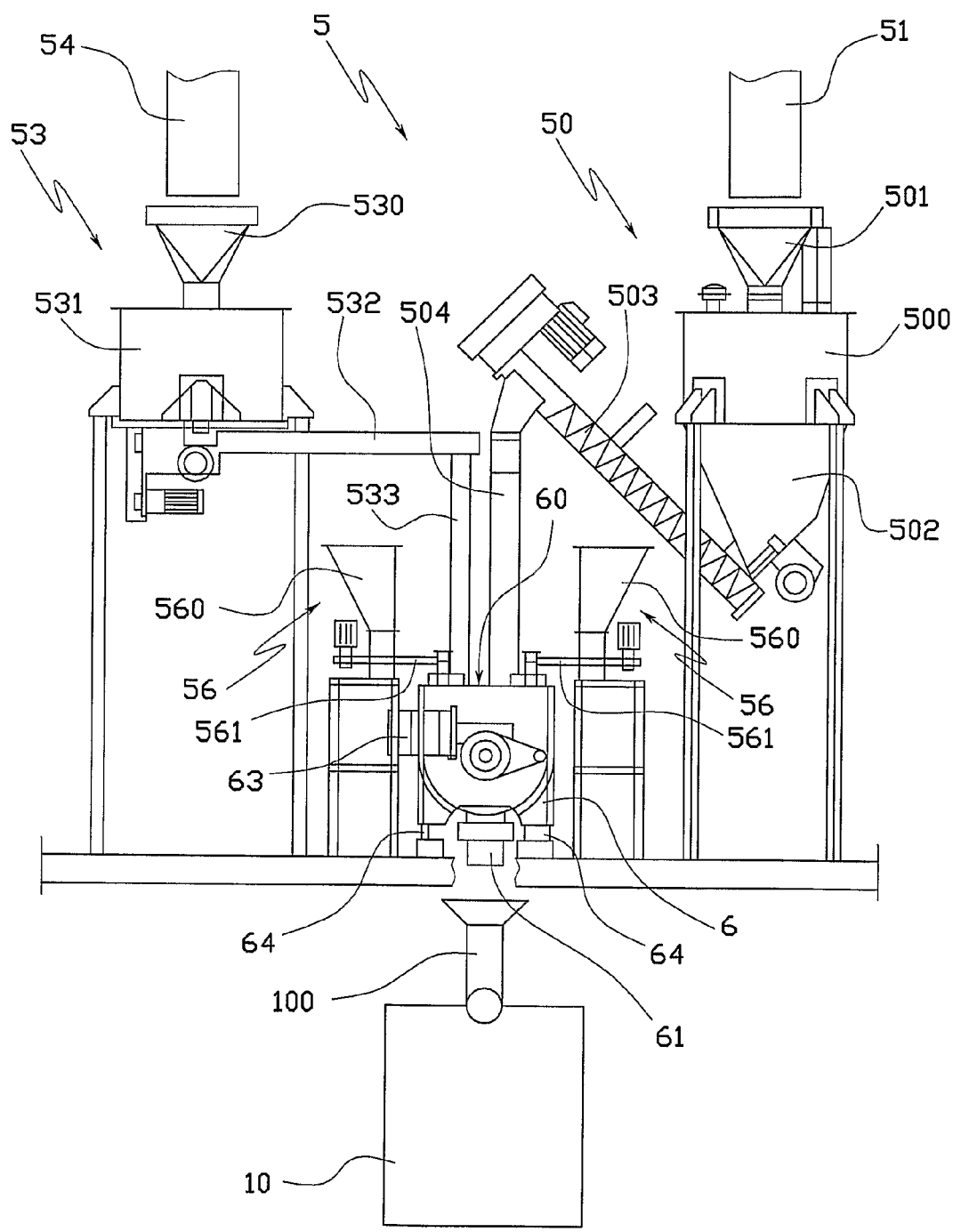
FIG. 2 illustrates an extruder station of the plant of FIG. 1 in greater detail.

As illustrated in FIG. 2, the first batching group 50 comprises a tank 500, which is provided with an inlet hopper 501 into which the conduit 51 opens, and an outlet hopper 502, through which the base mixture is loaded into a screw conveyor 503.

The screw conveyor 503 transports the base mixture up until releasing the mixture internally of a vertical inlet conduit 504, through which the base mixture is directly introduced into the loading mouth 60 of a mixer 6.

In this way, by specially controlling the functioning parameters of the screw conveyor 503, for example the rotation speed of the screw, it is possible to batch the quantity of base mixture which is introduced into the mixer 6.

Each extrusion station 5 further comprises a second batching group 53, similar to the previously described group, which is connected to the second distribution line 9 via a conduit 54 which comprises a loading mouth, in which the chain conveyor 90 releases the calcium carbonate, and a check valve 55 which regulates the flow of the calcium carbonate towards the second batching group 53.

As illustrated in FIG. 2, the second batching group 53 comprises an inlet hopper 530 which guides the calcium carbonate coming from the conduit 54 internally of a tank 531, to which tank 531 a screw conveyor 532 is associated.

The screw conveyor 532 conveys the calcium carbonate contained in the tank 531 towards an inlet conduit 533, from which the calcium carbonate falls directly into the loading mouth 60 of the above-mentioned mixer 6.

In this case too, by controlling the operating parameters of the screw conveyor 532, for example the rotation speed of the screw, the quantity of calcium carbonate dispensed into the mixer 6 can be carefully batched.

Each extrusion station 5 comprises two smaller identical batching groups 56, each of which dispenses a further additive to be added to the base mixture, for example for a colorant or a stabiliser.

Each batching group 56 comprises a hopper 560 for loading the additive, and dispenser means 561, for example a small screw conveyor, for dispensing batched quantities of the additive directly internally of the loading mouth 60 of the mixer 6.

As the further additives are normally added to the base mixture at a low percentage, the container hoppers 560 of the batching groups 56 can be manually replenished.

As schematically illustrated in FIG. 1, the mixer 6 of each extrusion station 5 generally comprises an external casing which is cylindrical and has a horizontal axis. The external casing is provided with the loading mouth 60 and an unloading mouth 61.

The loading mouth 60 and the unloading mouth 61 both have vertical axes and are respectively positioned at the opposite ends of the external casing. A mixing rotor 62 is installed in the casing, which is set in rotation by a motor 63 (see FIG. 2).

The mixing rotor 62 uniformly mixes the base mixture, the calcium carbonate in powder form and any other additives which are introduced in the mixer 6 by the loading mouth 60, such as to form a uniform and homogeneous final mixture.

At the same time, the mixing rotor 62 advances the materials towards the unloading mouth 61, from which the final mixture can freely exit.

Purely by way of example, the mixing rotor 62 can comprise a central shaft mounted coaxially in the external casing of the mixer 6 and projecting externally for connection with the motor 63, and a peripheral helix spiral-wound and fixed about the central shaft.

As illustrated in FIG. 2, the mixer 6 is installed on loading cells 64 for determining moment by moment the amount of material contained in the mixer 6.

Similarly the batching groups 50, 53 and 56 can also be singly installed on respective loading cells (not illustrated), which detect the quantity of material contained in each thereof, for each so as to be able to detect, moment by moment, the flow rate dispensed and to control the plant more precisely.

The unloading mouth 61 of the mixer 6 opens directly into the loading hopper 100 of a known-type extruder 10, which in a known way transforms the final loose mixture into a continuous manufactured product, solid and compact, such as for example a tube or a shaped bar.

The extruder 10 is of known type and is therefore not described in greater detail herein.

The functioning of the plant 1 includes the extruder 10 of each extrusion station 5 being supplied with a final mixture having a predetermined formulation, which is generally different from the formulation of the base mixture.

In particular, the final mixture contains a percentage of calcium carbonate which is greater than the percentage present in the base mixture.

The operation of each extrusion station 5 includes that the base mixture coming from the first distribution line 4 is tipped in batched quantities into the mixer 6, via the first batching group 50 and that contemporaneously the calcium carbonate coming from the second distribution line 9 is tipped in batched quantities into the mixer 6 via the second batching group 53.

In this way, internally of the mixer 6 the base mixture is enriched with additional quantities of calcium carbonate, in order to obtain a final mixture having a greater concentration of filler.

In particular, the final percentage of calcium carbonate might be greater than the critical percentage due to the phenomenon of segregation, without its causing any defects in the extruded products.

The mixer 6 is able to mix the base mixture uniformly and the additional particles of calcium carbonate, though remaining physically separated from the PVC powders, cannot undergo any segregation phenomenon, as the final mixture on leaving the unloading mouth 61 goes directly into the loading hopper 100 of the extruder 10.

In particular, with this system it has been possible to obtain extruded products free of defects, with percentages of calcium carbonate in the final mixture of about 30% of the overall mass.

Internally of the mixer 6, the base mixture, if so desired, can be enriched with other additives, including for example colorants and/or stabilisers, which are included in batched quantities via the batching groups 56, up to reaching exactly the final formulation determined for the relative extruder 10.

During functioning, the mixer 6 also acts as a temporary magazine for the extruder 10.

The mixer 6 can contain variable quantities of the mixture, allowing possible fluctuations in the production speed of the extruder 10.

The fluctuations can be monitored during the production, detecting the weight of the mixture accumulated in the mixer 6 moment by moment, thanks to the loading cells 64 on which the mixer 6 is resting.

In this way, it is for example possible to establish a maximum weight, beyond which the batching groups 50, 53 and 56 are halted to interrupt replenishing of material in the mixer 6, and a minimum weight, below which the replenishing action re-commences.

For each extrusion station 5 all the batching groups 50, 53 and 56 supply the mixer 6 contemporaneously, batching the respective materials in proportion with amounts deriving from the setting of the final formula, which is set by the operator in the management system provided which commands the plant 1. Note that the functioning of the plant 1 is preferably managed by a single automated management system, which is programmable such as to be able to set the formulation of the final mixture for each extrusion station 5 and also to control the functioning of the various batching groups such as to ensure that the predetermined formulation is obtained.

In particular the extrusion stations 5 can be set to extrude products having the same quality, to which the same final mixture formulation corresponds, with the aim of obtaining better plant 1 productivity.

Alternatively, the extrusion stations 5 can be set to extrude products of different qualities, to which different formulations of the final mixtures correspond, which final mixtures are to be introduced into the various extruders 10, with the aim of obtaining greater productive flexibility.

In the above case the first batching groups 50 of each of the extrusion stations 5 are preferably made to function such as to introduce, into the relative mixer 6, a same quantity of base mixture, and the second batching group 53 of the calcium carbonate and the batching groups 56 of the other additives are instead made to function such as to dispense different amounts according to the desired formulation of the final mixture.

There is, finally, the possibility that at least one of the extrusion stations 5 be set to extrude products requiring a percentage of calcium carbonate which coincides with that of the base mixture.

In this case, the first batching group 50 of the concerned extrusion station 5 would be de-activated, such as not to add calcium carbonate to the mixture in the mixer 6.

Thanks to the plant 1 of the invention numerous advantages are obtained during the extrusion process of the PVC- and calcium carbonate-based products.

In particular, the low percentage of calcium carbonate which is added to the PVC powders in the turbomixer 2 means that a base mixture is obtained which can easily be moved and stored if necessary, without incurring any problems related to segregation of the additives.

The independent management of the batching groups of each extrusion station 5, together with the fact of contemporaneously supplying all the components internally of the relative mixer 6 guarantees excellent batching precision and thus ensures that the exact formulation of the final mixture is obtained.

The mixer 6, positioned immediately upstream of the extruder 10, further guarantees a high level of homogeneity in the final mixture, preventing defects in the extruded products, and thus reducing the consumption of material.

Finally, the fact that a plurality of independent extrusion stations 5 can be supplied by a single distribution line of the base mixture (also known as dry-blend) coming from the turbomixer 2 gives the plant 1 high level of functional flexibility which in a traditional plant could only have been reached by increasing the number of lines of distribution (one for each type of formulation) and thus the costs of the plant.

Obviously a technical expert in the sector might make numerous modifications of a technical-applicational nature to the plant 1 and the relative extrusion method as described herein above, without forsaking the ambit of the invention as it is claimed herein below.

In particular, it is stressed that the number of the extrusion stations 5 illustrated herein is purely by way of example, and the stations 5 could be any number, chosen on the basis of plant 1 production needs.

The invention claimed is:
1. A method for extrusion of polymer products comprising:
preparing, in a turbomixer (2), a base mixture comprising polymer powders and at least an additive, wherein said additive in the base mixture is in a lower percentage than a critical percentage in which a segregation phenomenon of the additive in the base mixture is observed; and
introducing the base mixture in at least an extruder (10), via a mixer (6) into which an additional quantity of the same additive is introduced and enriching the base mixture introduced internally of the mixer (6) such as to obtain a final concentration which is above said critical percentage, wherein the additive is a calcium carbonate filler and the critical percentage of the calcium carbonate filler is lower than 12% of overall mass of the base mixture.

2. The method of claim 1, further comprising introducing the base mixture prepared in said turbomixer (2) into a plurality of distinct extruders (10) via respective mixers (6), into each of which mixers (6) a respective additional quantity of the additive is introduced.

3. The method of claim 1, wherein the polymer powders are PVC powders.

* * * * *